(12) United States Patent
Sundaram et al.

(10) Patent No.: US 8,931,061 B2
(45) Date of Patent: Jan. 6, 2015

(54) TECHNIQUES FOR PROVIDING ACCESS TO DATA IN DYNAMIC SHARED ACCOUNTS

(75) Inventors: Sharada Sundaram, Mountain View, CA (US); Robert Koeten, Menlo Park, CA (US)

(73) Assignee: Symantec Corporation, Mountain View, CA (US)

( * ) Notice: Subject to any disclaimer, the term of this patent is extended or adjusted under 35 U.S.C. 154(b) by 117 days.

(21) Appl. No.: 13/423,930

(22) Filed: Mar. 19, 2012

(65) Prior Publication Data
US 2012/0284776 A1 Nov. 8, 2012

Related U.S. Application Data

(60) Provisional application No. 61/482,189, filed on May 3, 2011.

(51) Int. Cl.
| | |
|---|---|
| *G06F 21/00* | (2013.01) |
| *G06F 17/30* | (2006.01) |
| *G06F 21/62* | (2013.01) |
| *H04L 29/06* | (2006.01) |
| *G06F 9/50* | (2006.01) |
| *H04L 9/32* | (2006.01) |

(52) U.S. Cl.
CPC .......... *H04L 63/104* (2013.01); *G06F 21/6218* (2013.01); *G06F 21/00* (2013.01); *H04L 63/105* (2013.01); *G06F 9/5061* (2013.01); *H04L 9/32* (2013.01); *G06F 17/30* (2013.01)
USPC ...................... 726/4; 709/200; 726/6; 726/12

(58) Field of Classification Search
CPC ............ G06F 21/00; G06F 17/30; H04L 9/32
USPC ...................... 726/4, 6, 12; 709/200
See application file for complete search history.

(56) References Cited

U.S. PATENT DOCUMENTS

| | | | |
|---|---|---|---|
| 2008/0022370 A1* | 1/2008 | Beedubail et al. | 726/4 |
| 2009/0172793 A1* | 7/2009 | Newstadt et al. | 726/6 |
| 2011/0023107 A1* | 1/2011 | Chen et al. | 726/12 |

OTHER PUBLICATIONS

Lorch et al., "Authorization and account management in the Open Science Grid," Grid Computing, the 6th IEE/ACM International Workshop on Seattle, WA, pp. 17-24, Nov. 13-14, 2005.
Jung Hwan Choi, "Ca-RBAC: Context Aware RBAC Scheme in Ubiquitous Computing Environments," Journal of Information Science and Engineering, vol. 26, pp. 1801-1816, Jan. 2010.
Sirisha et al., "API access control in cloud using the Role based access Control model," Trendz in information Science and Computing, IEEE, pp. 135-137, Dec. 17, 2010.
International Search Report and Written Opinon mailed on Jul. 24, 2012, for International application No. PCT/US2012/36355 filed May 3, 2012, 14 pages.

* cited by examiner

*Primary Examiner* — Brandon Hoffman
*Assistant Examiner* — Samuel Ambaye
(74) *Attorney, Agent, or Firm* — Wilmer Cutler Pickering Hale and Dorr LLP

(57) ABSTRACT

Techniques for providing access to data in dynamic shared accounts are disclosed. In one particular exemplary embodiment, the techniques may be realized as a system for providing data in dynamic shared accounts. The system may comprise one or more processors communicatively coupled to a network. The one or more processors may be configured to identify a first user associated with an account, identify a second user to have access to the account associated with the first user in the event the first user is unavailable to access data or perform functions associated with the account, map the second user to the account, and provide the second user access to the account based on the mapping and with access privileges associated with the first user.

20 Claims, 6 Drawing Sheets

TECHNIQUES FOR PROVIDING ACCESS TO DATA IN DYNAMIC SHARED ACCOUNTS

CROSS-REFERENCE TO RELATED APPLICATIONS

This patent application claims priority to U.S. Provisional Patent Application No. 61/482,189, filed May 3, 2011, which is hereby incorporated by reference herein in its entirety.

FIELD OF THE DISCLOSURE

The present disclosure relates generally to network monitoring and, more particularly, to techniques for providing access to data in dynamic shared accounts.

BACKGROUND OF THE DISCLOSURE

Cloud services are becoming increasingly popular. Software-as-a-Service (SaaS) is a cloud service and has its own specification of roles and permissions. Application programming interfaces (APIs) associated with SaaS may not be generic and vary from provider to provider. A setup on one particular SaaS may therefore be different than a setup on another SaaS. In addition, when users may migrate from one organizational entity to another or leave an organization entirely, data associated with such users may be orphaned and may need to be assigned or reassigned. Assigning or reassigning such data may be challenging, especially across multiple disparate SaaS or cloud service platforms.

In view of the foregoing, it may be understood that there may be significant problems and shortcomings associated with conventional assignment and access control technologies as applied to SaaS infrastructure.

SUMMARY OF THE DISCLOSURE

Techniques for providing access to data in dynamic shared accounts are disclosed. In one particular exemplary embodiment, the techniques may be realized as a system for providing data in dynamic shared accounts. The system may comprise one or more processors communicatively coupled to a network. The one or more processors may be configured to identify a first user associated with an account, identify a second user to have access to the account associated with the first user in the event the first user is unavailable to access data or perform functions associated with the account, map the second user to the account, and provide the second user access to the account based on the mapping and with access privileges associated with the first user.

In accordance with other aspects of this particular embodiment, the account may be a shared Software-as-a-Service (SaaS) account.

In accordance with further aspects of this particular embodiment, mapping the second user to the account may comprises identifying one or more predetermined roles associated with the account for the first user, identifying one or more pseudo accounts corresponding to the one or more predetermined roles, associating the second user with the one or more predetermined roles associated with the account for the first user, and mapping the second user to the one or more pseudo accounts based on the one or more predetermined roles associated with the second user.

In accordance with additional aspects of this particular embodiment, mapping the second user to the one or more pseudo accounts may further comprise a dynamic mapping.

In some embodiments, the dynamic mapping may allow data associated with the account to be shared with one or more additional users.

In accordance with other aspects of this particular embodiment, the one or more additional users may comprise the first user.

In accordance with further aspects of this particular embodiment, providing the second user access to the account may comprise authenticating an identifier associated with the second user. In some embodiments, providing the second user access to the account may further comprise providing single sign-on access to at least the account.

In accordance with additional aspects of this particular embodiment, the identifier may comprise at least one of a user identifier and password.

In another particular embodiment, the techniques may be realized as a method for providing data in dynamic shared accounts. The method may comprise identifying a first user associated with an account, identifying a second user to have access to the account associated with the first user in the event the first user is unavailable to access data or perform functions associated with the account, mapping the second user to the account, and providing the second user access to the account based on the mapping and with access privileges associated with the first user.

In accordance with other aspects of this particular embodiment, the account may be a shared Software-as-a-Service (SaaS) account.

In accordance with further aspects of this particular embodiment, mapping the second user to the account may comprises identifying one or more predetermined roles associated with the account for the first user, identifying one or more pseudo accounts corresponding to the one or more predetermined roles, associating the second user with the one or more predetermined roles associated with the account for the first user, and mapping the second user to the one or more pseudo accounts based on the one or more predetermined roles associated with the second user.

In accordance with additional aspects of this particular embodiment, mapping the second user to the one or more pseudo accounts may further comprise a dynamic mapping. In some embodiments, the dynamic mapping may allow data associated with the account to be shared with one or more additional users.

In accordance with other aspects of this particular embodiment, the one or more additional users may comprise the first user.

In accordance with further aspects of this particular embodiment, providing the second user access to the account may comprise authenticating an identifier associated with the second user. In some embodiments, providing the second user access to the account may further comprise providing single sign-on access to at least the account.

In accordance with additional aspects of this particular embodiment, the identifier may comprise at least one of a user identifier and password.

In another particular embodiment, the techniques may be realized as a system for dynamically sharing accounts. The system may comprise one or more processors communicatively coupled to a network. The one or more processors may be configured to create at least one account associated with a service, create one or more roles for the at least one account, create at least one pseudo account corresponding to each of the one or more roles, and assign at least one of the one or more roles to a plurality users for dynamically mapping the plurality of users to the at least one pseudo account for access to the at least one account based on the one or more roles, wherein each of the plurality of users has access to data associated with the at least one account. In some embodiments, each of the plurality of users may be able to access data or perform one or more functions associated with the at least one account.

In accordance with other aspects of this particular embodiment, the at least one account may be at least one shared account and the service is a Software-as-a-Service.

In another particular embodiment, the technique(s) may be realized as a method for dynamically sharing accounts. The method may comprise creating at least one account associated with a service, creating one or more roles for the at least one account, creating at least one pseudo account corresponding to each of the one or more roles, and assigning at least one of the one or more roles to a plurality users for dynamically mapping the plurality of users to the at least one pseudo account for access to the at least one account based on the one or more roles, wherein each of the plurality of users has access to data associated with the at least one account. In some embodiments, each of the plurality of users may be able to access data or perform one or more functions associated with the at least one account.

In accordance with other aspects of this particular embodiment, the at least one account may be at least one shared account and the service is a Software-as-a-Service.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION OF EXEMPLARY EMBODIMENTS

Figure 1:
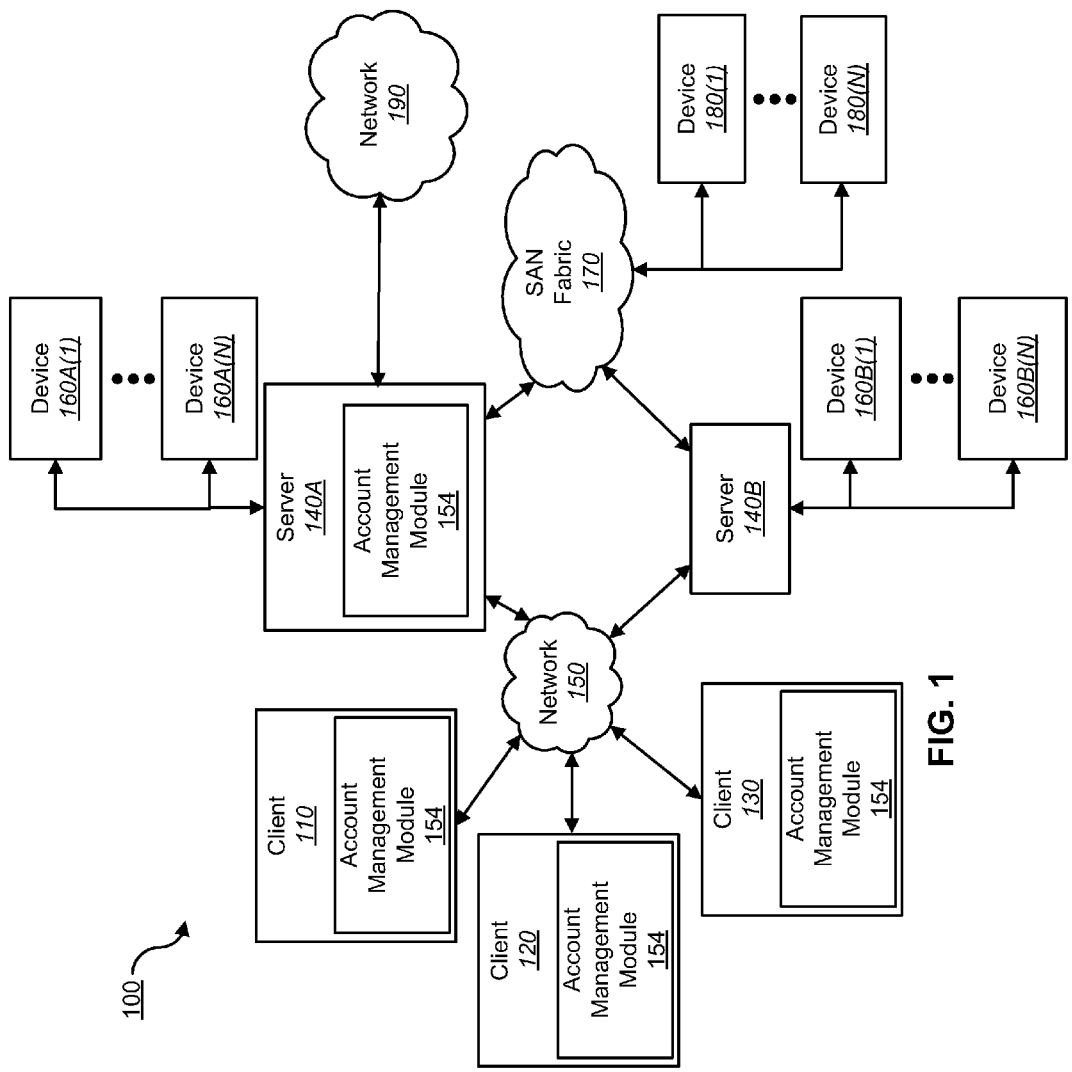
FIG. 1 shows a block diagram depicting a network architecture for providing access to data in dynamic shared accounts in accordance with an embodiment of the present disclosure.

FIG. 1 shows a block diagram depicting a network architecture 100 for providing access to data in dynamic shared accounts in accordance with an embodiment of the present disclosure. FIG. 1 is a simplified view of network architecture 100, which may include additional elements that are not depicted. Network architecture 100 may contain client systems 110, 120 and 130, as well as servers 140A and 140B (one or more of which may be implemented using computer system 200 shown in FIG. 2). Client systems 110, 120 and 130 may be communicatively coupled to a network 150. Server 140A may be communicatively coupled to storage devices 160A(1)-(N), and server 140B may be communicatively coupled to storage devices 160B(1)-(N). Servers 140A and 140B may contain a management module (e.g., account management module 154 of server 140A). Servers 140A and 140B may be communicatively coupled to a SAN (Storage Area Network) fabric 170. SAN fabric 170 may support access to storage devices 180(1)-(N) by servers 140A and 140B, and by client systems 110, 120 and 130 via network 150.

Figure 2:
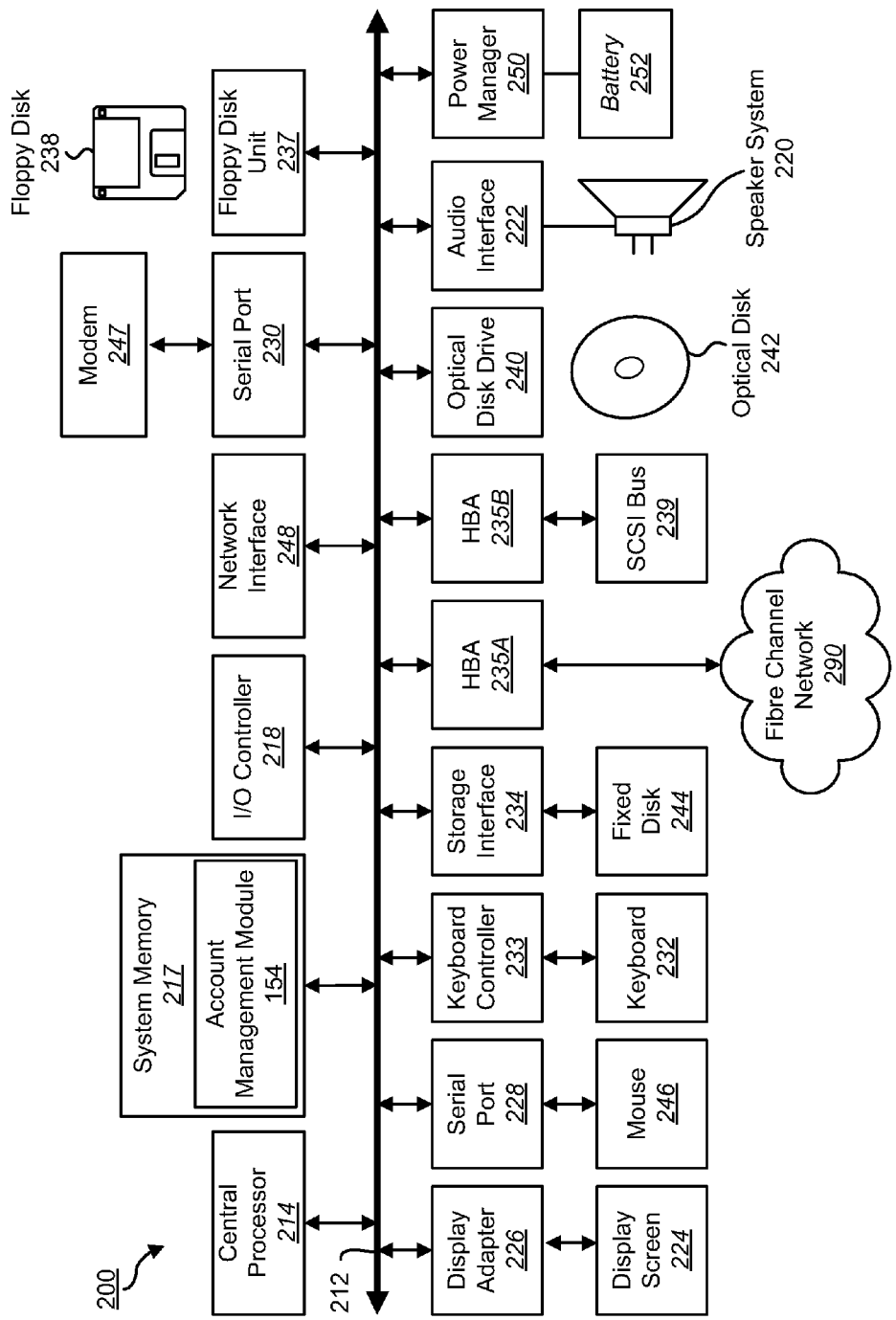
FIG. 2 depicts a block diagram of a computer system for providing access to data in dynamic shared accounts in accordance with an embodiment of the present disclosure.

With reference to computer system 200 of FIG. 2, modem 247, network interface 248, or some other method may be used to provide connectivity from one or more of client systems 110, 120 and 130 to network 150. Client systems 110, 120 and 130 may be able to access information on server 140A or 140B using, for example, a web browser or other client software (not shown). Such a client may allow client systems 110, 120 and 130 to access data hosted by server 140A or 140B or one of storage devices 160A(1)-(N), 160B(1)-(N), and/or 180(1)-(N).

Networks 150 and 190 may be local area networks (LANs), wide area networks (WANs), the Internet, cellular networks, satellite networks, or other networks that permit communication between clients 110, 120, 130, servers 140, and other devices communicatively coupled to networks 150 and 190. Networks 150 and 190 may further include one, or any number, of the exemplary types of networks mentioned above operating as a stand-alone network or in cooperation with each other. Networks 150 and 190 may utilize one or more protocols of one or more clients or servers to which they are communicatively coupled. Networks 150 and 190 may translate to or from other protocols to one or more protocols of network devices. Although networks 150 and 190 are each depicted as one network, it should be appreciated that according to one or more embodiments, networks 150 and 190 may each comprise a plurality of interconnected networks.

Storage devices 160A(1)-(N), 160B(1)-(N), and/or 180(1)-(N) may be network accessible storage and may be local, remote, or a combination thereof to server 140A or 140B. Storage devices 160A(1)-(N), 160B(1)-(N), and/or 180(1)-(N) may utilize a redundant array of inexpensive disks ("RAID"), magnetic tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), optical based storage, or other computer accessible storage. Storage devices 160A(1)-(N), 160B(1)-(N), and/or 180(1)-(N) may be used for backup or archival purposes.

According to some embodiments, clients 110, 120, and 130 may be smartphones, PDAs, desktop computers, a laptop computers, servers, other computers, or other devices coupled via a wireless or wired connection to network 150. Clients 110, 120, and 130 may receive data from user input, a database, a file, a web service, and/or an application programming interface.

Servers 140A and 140B may be application servers, archival platforms, backup servers, network storage devices, media servers, email servers, document management platforms, enterprise search servers, or other devices communicatively coupled to network 150. Servers 140A and 140B may utilize one of storage devices 160A(1)-(N), 160B(1)-(N), and/or 180(1)-(N) for the storage of application data, backup data, or other data. Servers 140A and 140B may be hosts, such as an application server, which may process data traveling between clients 110, 120, and 130 and a backup platform, a backup process, and/or storage. According to some embodiments, servers 140A and 140B may be platforms used for backing up and/or archiving data. One or more portions of data may be backed up or archived based on a backup policy and/or an archive applied, attributes associated with the data source, space available for backup, space available at the data source, or other factors.

According to some embodiments, clients 110, 120, and/or 130 may contain one or more portions of software for providing access to data in dynamic shared accounts such as, for example, account management module 154. As illustrated, one or more portions of account management module 154 may reside at a network centric location. For example, server 140A may be a server, a firewall, a gateway, or other network element that may perform one or more actions to provide role-based access control using dynamic shared accounts. According to some embodiments, network 190 may be an external network (e.g., the Internet) and server 140A may be a gateway or firewall between one or more internal components and clients and the external network.

Account management module 154 may provide, among other things, role-based access control (RBAC) for Software-as-a-Service (SaaS) or a cloud computing model for an enterprise. On the SaaS provider side, at least one account may be setup. Each of the at least one accounts may be setup with specific permissions for a designated role in the organization. Furthermore, each account may be pre-configured with variable access rights for one or more users.

When a user logs in to access one or more features of one or more SaaS, account management module 154 may be responsible for single sign on, user identification, authentication and authorization for all the users. For example, account management module 154 may not only grant access to the user (e.g., via single sign-on), but also provision a particular account to one or more SaaS providers associated with the account management module 154. Based on the role and responsibility of the user in an organization or company, the user may be dynamically provisioned to any one of the pre-configured user accounts. Thus, the access of the user on the SaaS application may be accessible and/or restricted based on role and his permissions.

Accordingly, account management module 154 may integrate role-based access control throughout an organization without dependency on the SaaS provider and/or specific implementation requirements of the SaaS. By dynamically mapping each of a plurality of users to one or more accounts for one or more of the various roles created for one or more SaaS, role-based access control using dynamic shared accounts may be provided to a SaaS applications on the cloud through federated identity management.

Using dynamic shared accounts may allow a more integrated and efficient approach to data management. As described above, when users migrate from one organizational entity to another or leave an organization entirely, data associated with such users may be orphaned and may need to be assigned or reassigned. In conventional systems, assigning or reassigning such data may be challenging, especially across multiple disparate SaaS or cloud service platforms, if at all possible. However, an account management module 154 may easily provide access to data with one or more users, or vice versa.

FIG. 2 depicts a block diagram 200 of a computer system for providing access to data in dynamic shared accounts in accordance with an embodiment of the present disclosure.

Computer system 200 is suitable for implementing techniques in accordance with the present disclosure. Computer system 200 may include a bus 212 which may interconnect major subsystems of computer system 210, such as a central processor 214, a system memory 217 (e.g. RAM (Random Access Memory), ROM (Read Only Memory), flash RAM, or the like), an Input/Output (I/O) controller 218, an external audio device, such as a speaker system 220 via an audio output interface 222, an external device, such as a display screen 224 via display adapter 226, serial ports 228 and 230, a keyboard 232 (interfaced via a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included may be a mouse 246 (or other point-and-click device, coupled to bus 212 via serial port 228), a modem 247 (coupled to bus 212 via serial port 230), network interface 248 (coupled directly to bus 212), power manager 250, and battery 252.

Bus 212 allows data communication between central processor 214 and system memory 217, which may include read-only memory (ROM) or flash memory (neither shown), and random access memory (RAM) (not shown), as previously noted. The RAM is may be the main memory into which the operating system and application programs may be loaded. The ROM or flash memory can contain, among other code, the Basic Input-Output system (BIOS) which controls basic hardware operation such as the interaction with peripheral components. Applications resident with computer system 210 may be stored on and accessed via a computer readable medium, such as a hard disk drive (e.g., fixed disk 244), an optical drive (e.g., optical drive 240), a floppy disk unit 237, or other storage medium. For example, account management module 154 may be resident in system memory 217.

Storage interface 234, as with the other storage interfaces of computer system 210, can connect to a standard computer readable medium for storage and/or retrieval of information, such as a fixed disk drive 244. Fixed disk drive 244 may be a part of computer system 210 or may be separate and accessed through other interface systems. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. Code to implement the present disclosure may be stored in computer-readable storage media such as one or more of system memory 217, fixed disk 244, optical disk 242, or floppy disk 238. Code to implement the present disclosure may also be received via one or more interfaces and stored in memory. The operating system provided on computer system 210 may be MS-DOS®, MS-WINDOWS®, OS/2®, OS X®, UNIX®, Linux®, or another known operating system.

Power manager 250 may monitor a power level of battery 252. Power manager 250 may provide one or more APIs (Application Programming Interfaces) to allow determination of a power level, of a time window remaining prior to shutdown of computer system 200, a power consumption rate, an indicator of whether computer system is on mains (e.g., AC Power) or battery power, and other power related information. According to some embodiments, APIs of power manager 250 may be accessible remotely (e.g., accessible to a remote backup management module via a network connection). According to some embodiments, battery 252 may be an Uninterruptable Power Supply (UPS) located either local to or remote from computer system 200. In such embodiments, power manager 250 may provide information about a power level of an UPS.

Figure 3:
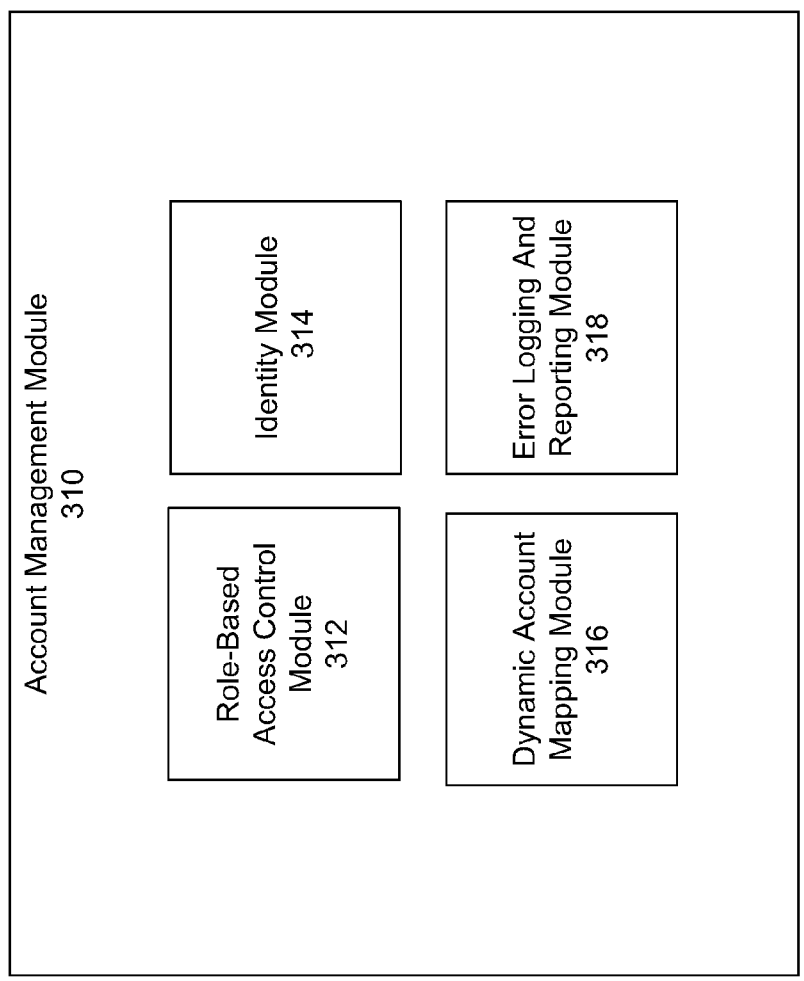
FIG. 3 shows a module for providing access to data in dynamic shared accounts in accordance with an embodiment of the present disclosure.

FIG. 3 shows a module 310 for providing access to data in dynamic shared accounts in accordance with an embodiment of the present disclosure. Referring to FIG. 3, there is shown a account management module 310 in accordance with an embodiment of the present disclosure. As illustrated, the account management module 310 may contain one or more components including role-based access control module 312, identity module 314, dynamic account mapping module 316, and error logging and reporting module 318.

The description below describes network elements, computers, and/or components of a system and method for providing access to data in dynamic shared accounts that may include one or more modules. As used herein, the term "module" may be understood to refer to computing software, firmware, hardware, and/or various combinations thereof. Modules, however, are not to be interpreted as software which is not implemented on hardware, firmware, or recorded on a processor readable recordable storage medium (i.e., modules are not software per se). It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

Role-based access control module 312 may request creation of one or more accounts with one or more SaaS. Role-based access control module 312 may create one or more profiles. Each of the one or more profiles may provide permissions for either a specific object or a set of objects. For each role that represents a specific job function, role-based access control module 312 may assign a specific set of permissions profile applicable to that role. For each role, role-based access control module 312 may create at least one account on the SaaS provider. It should be appreciated that many accounts may be created for a particular role to enable multiple users to login at the same time. As used herein, these accounts may be referred to as "pseudo accounts." In effect, one or more pseudo accounts may serve as one or more slots associated with a particular role for an account at the SaaS provider.

In some embodiments, a user may have hold one role for a specific application. Here, when the user switches application, the user may assume a different role and may perform an action specific to that role. However, this may not always be the case.

In some embodiments, roles for each pseudo account may differ for each user across various applications. For example, an employee may have employee-level access in one SaaS application and may be a system administrator for another SaaS application.

One benefit with role-based access control using dynamic shared accounts across multiple applications may be that if any updates to the various roles needed to occur, access privileges may be adjusted through adjustments in the pseudo account level. Any user associated with that particular role would receive a corresponding change in accessibility and privilege to their user account. This may provide greater flexibility, efficiency, and reliability.

Another benefit with role-based access control using dynamic shared accounts across multiple applications may be that various users may have access to the same account or data. Having group ownership or sharing facilitates data reassignment or provisioning in the event of user termination or movement of a user from one organization entity to another, especially if there are different access privileges associated with the organization entities.

Identity module 314 may provide a user interface to a plurality of users in an organization. For example, rather than directly logging in to an individual account at the SaaS application, a user may log into via this user interface. Identity module 314 may provide, among other things, various features, including, but not limited to single sign-on, user identification, authentication and authorization, and/or role-based verification.

One benefit with using identity module 314 may be that users seeking access to one or more SaaS applications may be allowed, e.g., via a single sign on procedure, to access one or more accounts on a plurality of SaaS applications without logging in multiple times. Again, this may provide greater flexibility and efficiency.

Dynamic account mapping module 316 may map each user who logs in via identity module 314 to one or more pseudo accounts. Mapping to these pseudo accounts may be dynamic. As described above, since there may be a limited number of pseudo account created for each role at each SaaS, dynamic account mapping module 316 may be able to provide one or more users access to each SaaS based on an availability of each pseudo account or take other priority measures.

Error logging and reporting module 318 may produce logs, reports, or other information associated with providing access to data in dynamic shared accounts.

Figure 4:
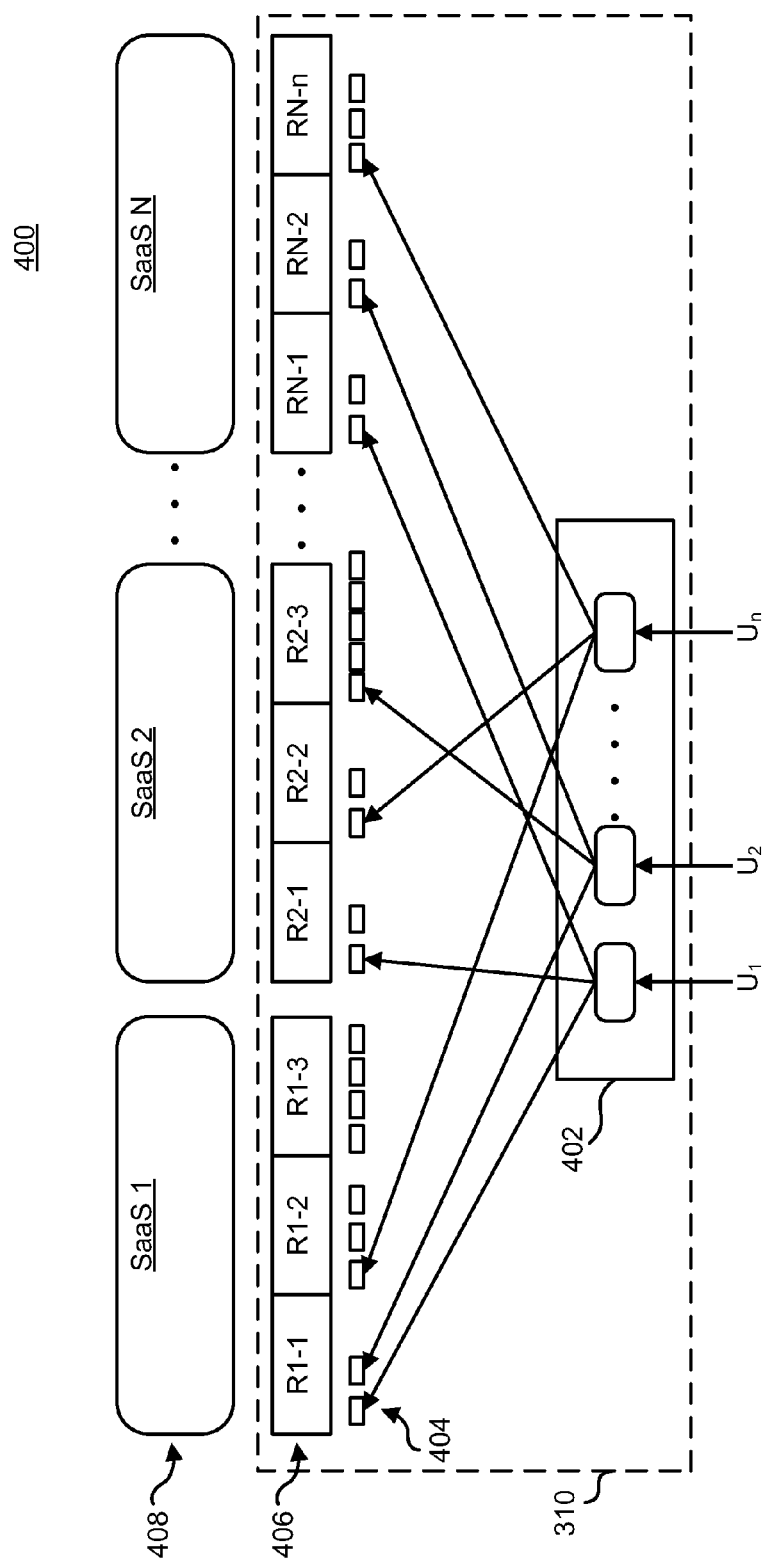
FIG. 4 depicts a mapping schematic for providing access to data in dynamic shared accounts in accordance with an embodiment of the present disclosure.

FIG. 4 depicts a mapping schematic 400 for providing access to data in dynamic shared accounts in accordance with an embodiment of the present disclosure. Referring to FIG. 4, a plurality of users, $U_1, U_2, \ldots, U_n$ may seek access to one or more cloud services, e.g., SaaS 1, SaaS 2, . . . , SaaS n. To gain access, each user $U_1, U_2,$ or $U_n$ may login to corresponding user accounts 402 at the account management module 310. The user accounts 402 may be mapped to one or more pseudo accounts 404 based on predetermined roles 406 for the SaaS 408.

For example, SaaS 1 may be a sales service, such as SalesForce.com, SaaS 2 may be an accounting service, such as Concur Expense Reporting, and SaaS N may be a Google-Docs document service, where N may be an integer. There may be accounts created at SaaS 1 with the following corresponding roles: R1-1, R1-2, and R1-3. R1-1 may be directed to a sales manager role, R1-2 may be directed to a sales representative role, and R1-3 may be directed to public view role. There may be accounts created at SaaS 2 with the following corresponding roles: R2-1, R2-2, and R2-3. R2-1 may be directed to a finance role, R2-2 may be directed to a manager role, and R2-3 may be directed to an employee role. There may be accounts created at SaaS 3 with the following corresponding roles: RN-1, RN-2, and R1-$n$. RN-1 may be directed to a full editor role, RN-2 may be directed to a partial editor role, and RN-n may be directed to read-only role, where n may be an integer.

When a user $U_1$ logs in via the account management module 310, user $U_1$ may have sales manager privileges at SaaS 1, finance privileges at SaaS 2, and full editor access at SaaS N. In this example, user $U_1$ may be an executive at a particular corporation who has full or almost full access to all the SaaS applications.

User $U_2$ may also log in via the account management module 310. While user $U_2$ may have sales manager access to SaaS 1, user $U_2$ may have only employee access in SaaS 2 and partial editor access in SaaS N. As a result, depending on an employee's role in an organization, his or her user-level access to one or more SaaS applications may be preconfigured accordingly in the accounts management module 310.

User $U_n$ may also log in at the same time that user $U_1$ and user $U_2$ are logged in. In one scenario, $U_n$ may also have sales manager privileges to SaaS 1. However, since user $U_1$ and user $U_2$ are already logged in to the only two pseudo accounts created for that role, R1-1, user $U_n$ may not have access to SaaS 1 as a sales manager at that time. In some embodiments, user $U_n$ may be denied access. In other embodiments, user $U_n$ may be asked to wait. In yet other embodiments, user $U_n$ may be granted access to another role that would provide equal or lesser access privileges than R1-1. For example, user $U_n$ may be offered access to R1-2 instead. Here, user $U_n$ may accept since user $U_n$ may only need to access information on SaaS 1 that both sales managers and sales representatives can access. Therefore, account management module 310 may provide dynamic mapping to the one or more shared accounts for each of the plurality of SaaS applications.

Because data is owned are shared by a group of users, such data may be within the purview of an organization's purview. As a result, dynamically shared data facilitates access among a plurality of users, which may be especially helpful in situations where data would typically be orphaned by a user that is terminated or is moved to another organization entity with different access privileges and/or data associated to the user's new role.

For example, in a travel SaaS application of a travel organization, there may be three classes of users: employees, travel agents, and system administrators. All ticketing functions may be typically achieved by travel agents. But because all the data associated with ticketing functions may be owned or shared by the entire organization rather than the individual travel agents or their individual accounts, if the travel agents is terminated or leaves the organization or is otherwise not available to perform his or functions, a replacement travel agent may be able to handle all the same ticketing functions since the replacement travel agent may be provisioned to have access to the same data left by the unavailable travel agent user. The aforementioned features may find utility in data sharing, data inheritance, or a more advanced, robust model for data/user assignment or reassignment.

In some embodiments, shared data may be associated with one or more tags or labels. Use of tags or labels may facilitate identification and/or movement of data.

Figure 5:
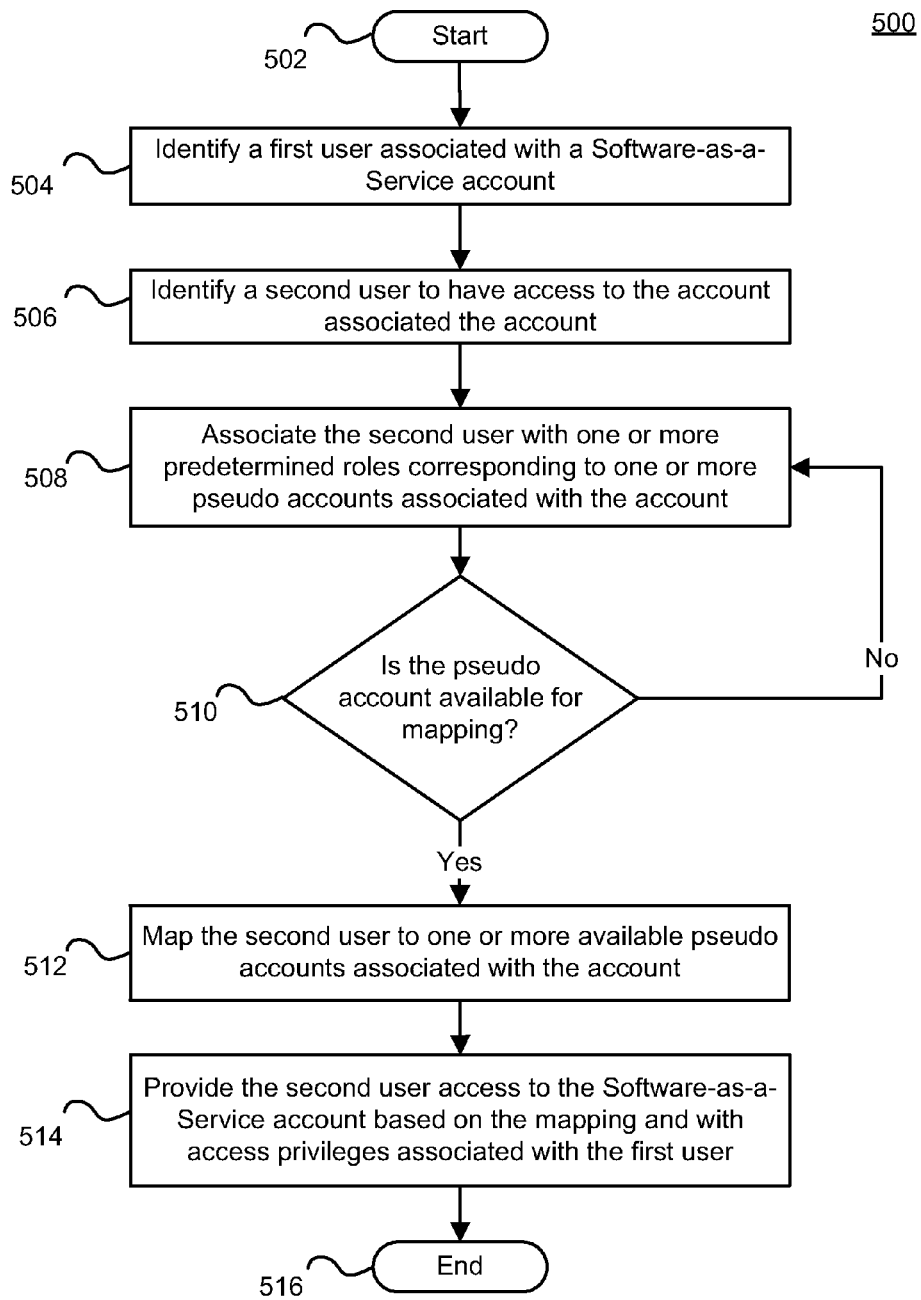
FIG. 5 depicts a flowchart of a method for providing access to data in dynamic shared accounts in accordance with an embodiment of the present disclosure.

FIG. 5 depicts a flowchart 500 of a method for providing access to data in dynamic shared accounts in accordance with an embodiment of the present disclosure. The exemplary method 500 is provided by way of example, as there are a variety of ways to carry out methods disclosed herein. The method 500 shown in FIG. 5 may be executed or otherwise performed by one or a combination of various systems. The method 500 is described below as carried out by at least system 100 in FIG. 1, architecture 200 in FIG. 2, module 310 in FIG. 3, and schematic 400 of FIG. 4, by way of example, and various elements of systems 100, 200, 310, and 400 are referenced in explaining the exemplary method of FIG. 5. Each block shown in FIG. 5 represents one or more processes, methods, or subroutines carried in the exemplary method 500. A non-transitory computer-readable medium comprising code, which when performed by a computer, may perform the acts of the method 500 may also be provided. Referring to FIG. 5, the exemplary method 500 may begin at block 502.

At block 502, the method 500 may begin.

At block 504, the account management module 310 may identify a first user associated with an account. The account may be a Software-as-a-Service (SaaS) account.

At block 506, the account management module 310 may identify a second user to have access to the account associated with the first user. For example, in the event the first user is unavailable to access data or perform functions associated with the account, a second user may provided access to the account originally associated with the first user.

At block 508, the account management module 310 may map the second user to the account. Mapping the second user to the account may further comprise identifying one or more predetermined roles associated with the account for the first user. Mapping the second user to the account may also comprise identifying one or more pseudo accounts corresponding to the one or more predetermined roles. The second user may then be associated with the one or more predetermined roles associated with the account for the first user. The second user may then be mapped to the one or more pseudo accounts based on the one or more predetermined roles associated with the second user.

In some embodiments, availability of the one or more pseudo accounts may be determined 510. If, for example, the one or more pseudo accounts are not available for mapping, e.g., because the one or more pseudo accounts are being accessed by other users in the organization at the time of the request/mapping, mapping the user to the one or more pseudo accounts may halt and continue at a later time. In some embodiments, other available pseudo accounts corresponding to other equal or lesser roles may be made available to the user. In other embodiments, the user may simply be denied access to the account and would try mapping later.

At block 512, the account management module 310 may map the user to the account via the one or more pseudo accounts in the event the one or more pseudo account is available for mapping. As discussed above, in some cases, the account management module 310 may map the user to another pseudo account with equal or lesser privileges if the pseudo account corresponding to the predetermined roles is unavailable.

It should be appreciated that mapping the second user to the one or more pseudo accounts comprises a dynamic mapping. Dynamic mapping allows data associated with the account to be shared with one or more additional users, e.g., the first user or other user.

At block 514, the account management module 310 may provide the second user access to the one or more Software-as-a-Service accounts based on the mapping of the user to the one or more pseudo accounts corresponding to the one or more predetermined roles of the user.

It should be appreciated that providing the second user access to the account may comprise authenticating an identifier associated with the second user. The identifier may comprise a user identifier, password, and/or other identifier. Authenticating the identifier may also comprise providing the second user access to the account comprises providing single sign-on access to at least the account.

At block 516, the method 500 may end.

Figure 6:
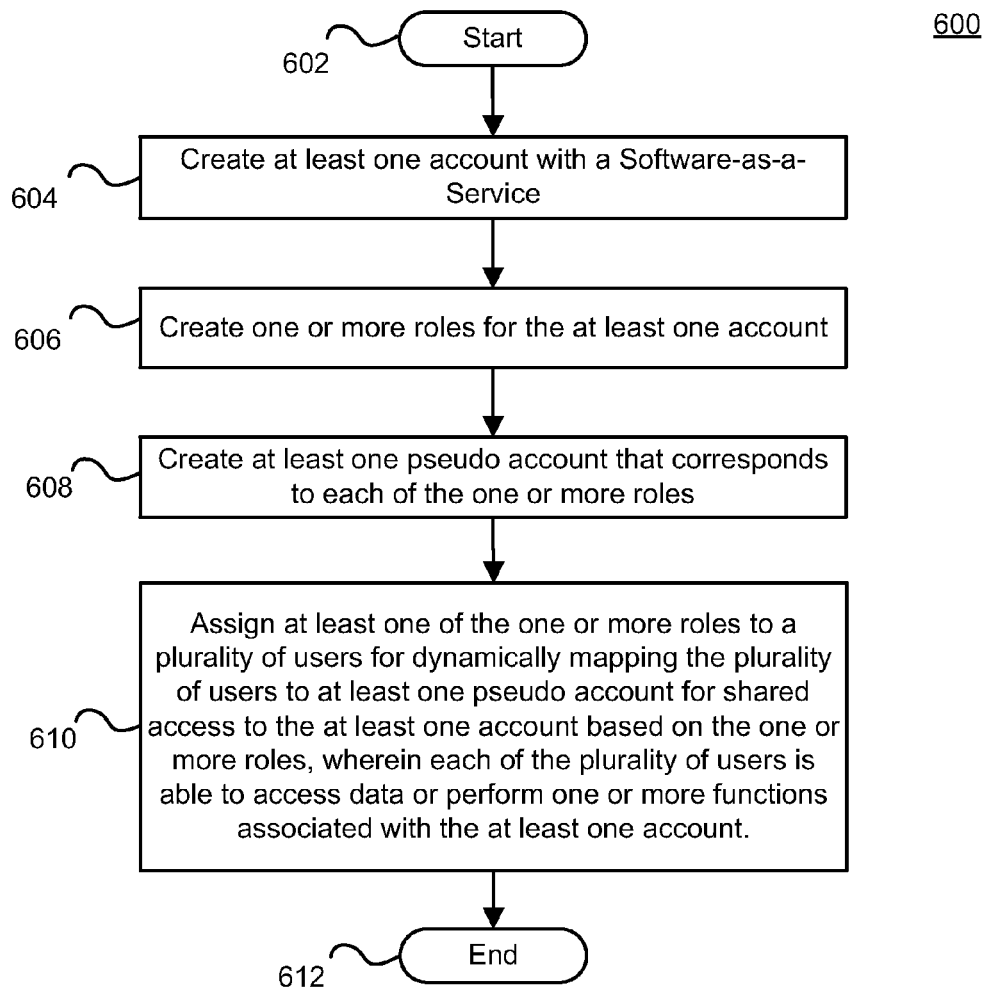
FIG. 6 depicts a flowchart of a method for providing access to data in dynamic shared accounts in accordance with an embodiment of the present disclosure.

FIG. 6 depicts a flowchart 600 of a method for providing access to data in dynamic shared accounts in accordance with an embodiment of the present disclosure. The exemplary method 600 is provided by way of example, as there are a variety of ways to carry out methods disclosed herein. The method 600 shown in FIG. 6 may be executed or otherwise performed by one or a combination of various systems. The method 600 is described below as carried out by at least system 100 in FIG. 1, architecture 200 in FIG. 2, module 310 in FIG. 3, and schematic 400 of FIG. 4, by way of example, and various elements of systems 100, 200, 310, and 400 are referenced in explaining the exemplary method of FIG. 6. Each block shown in FIG. 6 represents one or more processes, methods, or subroutines carried in the exemplary method 600. A non-transitory computer-readable medium comprising code, which when performed by a computer, may perform the acts of the method 600 may also be provided. Referring to FIG. 6, the exemplary method 600 may begin at block 602.

At block 602, the method 600 may begin.

At block 604, at least one account may be created with a Software-as-a-Service (SaaS). In some embodiments, this may be achieved using the account management module 310. The account may be a shared account with preconfigured rules and privileges.

At block 606, one or more roles for the at least one account may be created. These roles may also have preconfigured rules and privileges based on needs of an organization's policies and roles of its users. In some embodiments, this may be achieved using the account management module 310.

At block 608, at least one pseudo account corresponding to each of the one or more roles may be created. In some embodiments, this may be achieved using the account management module 310.

At block 610, at least one of the one or more roles may be assigned to a plurality users for dynamically mapping the plurality of users to the at least one pseudo account for access to the at least one account based on the one or more roles. In some embodiments, this may be achieved using the account management module 310. By assigning the at least one of the one or more roles to a plurality of users, rather than just a single user, allows each of the plurality of users the ability to access data or perform one or more functions associated with the at least one account. As described above, in the event one user is terminated or is otherwise unavailable to access data or perform one or more functions associated with the account, another user may readily fill in for that user and have access to data or perform one or more functions associated with that account.

At block 612, the method 600 may end.

At this point it should be noted that providing access to data in dynamic shared accounts in accordance with the present disclosure as described above typically involves the processing of input data and the generation of output data to some extent. This input data processing and output data generation may be implemented in hardware or software. For example, specific electronic components may be employed in a account management module or similar or related circuitry for implementing the functions associated with providing access to data in dynamic shared accounts in accordance with the present disclosure as described above. Alternatively, one or more processors operating in accordance with instructions may implement the functions associated with providing access to data in dynamic shared accounts in accordance with the present disclosure as described above. If such is the case, it is within the scope of the present disclosure that such instructions may be stored on one or more processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A system for providing data in dynamic shared accounts comprising:
   one or more processors communicatively coupled to a network, wherein the one or more processors are configured to:
   identify a first user associated with an account;
   identify a second user to have access to the account associated with the first user in the event the first user is unavailable to access data or perform functions associated with the account;
   determine availability of one or more pseudo accounts corresponding to one or more predetermined roles associated with the account for the first user;
   map the second user to the account using the one or more pseudo accounts; and
   provide the second user access to the account based on the mapping and with access privileges associated with the first user.

2. The system of claim 1, wherein the account is a shared Software-as-a-Service (SaaS) account.

3. The system of claim 1, wherein mapping the second user to the account comprises:
   identifying the one or more predetermined roles associated with the account for the first user;
   identifying the one or more pseudo accounts, wherein the one or more pseudo accounts correspond to the one or more predetermined roles;
   associating the second user with the one or more predetermined roles associated with the account for the first user; and
   mapping the second user to the one or more pseudo accounts based on the one or more predetermined roles associated with the second user.

4. The system of claim 3, wherein mapping the second user to the one or more pseudo accounts comprises a dynamic mapping, wherein the dynamic mapping further allows data associated with the account to be shared with one or more additional users.

5. The system of claim 4, wherein the one or more additional users comprises the first user.

6. The system of claim 1, wherein providing the second user access to the account comprises authenticating an identifier associated with the second user, wherein providing the second user access to the account comprises providing single sign-on access to at least the account.

7. The system of claim 6, wherein the identifier comprises at least one of a user identifier and password.

8. A method for providing data in dynamic shared accounts comprising:
identifying a first user associated with an account;
identifying a second user to have access to the account associated with the first user in the event the first user is unavailable to access data or perform functions associated with the account;
determining availability of one or more pseudo accounts corresponding to one or more predetermined roles associated with the account for the first user;
mapping the second user to the account using the one or more pseudo accounts; and
providing the second user access to the account based on the mapping and with access privileges associated with the first user.

9. The method of claim 8, wherein the account is a shared Software-as-a-Service (SaaS) account.

10. The method of claim 8, wherein mapping the second user to the account comprises:
identifying the one or more predetermined roles associated with the account for the first user;
identifying the one or more pseudo accounts, wherein the one or more pseudo accounts correspond to the one or more predetermined roles;
associating the second user with the one or more predetermined roles associated with the account for first user; and
mapping the second user to the one or more pseudo accounts based on the one or more predetermined roles associated with the second user.

11. The method of claim 10, wherein mapping the second user to the one or more pseudo accounts comprises a dynamic mapping, wherein the dynamic mapping further allows data associated with the account to be shared with one or more additional users.

12. The method of claim 11, wherein the one or more additional users comprises the first user.

13. The method of claim 8, wherein providing the second user access to the account comprises authenticating an identifier associated with the second user, wherein providing the second user access to the account comprises providing single sign-on access to at least the account.

14. The method of claim 13, wherein the identifier comprises at least one of a user identifier and password.

15. A non-transitory computer-readable storage medium storing a computer program of instructions configured to be readable by at least one computer processor for instructing the at least one computer processor to execute a computer process for performing the method of claim 8.

16. A system for dynamically sharing accounts comprising:
one or more processors communicatively coupled to a network, wherein the one or more processors are configured to:
create at least one account associated with a service, wherein the at least one account has preconfigured rules and privileges;
create one or more roles for the at least one account, wherein the one or more roles have preconfigured rules and privileges;
create at least one pseudo account corresponding to each of the one or more roles; and
assign at least one of the one or more roles to a plurality users for dynamically mapping the plurality of users to the at least one pseudo account for access to the at least one account based on the one or more roles, wherein each of the plurality of users has access to data associated with the at least one account, wherein each of the plurality of users is able to access data or perform one or more functions associated with the at least one account.

17. The system of claim 16, wherein the at least one account is at least one shared account and the service is a Software-as-a-Service.

18. A method for dynamically sharing accounts comprising:
creating at least one account associated with a service, wherein the at least one account has preconfigured rules and privileges;
creating one or more roles for the at least one account, wherein the one or more roles have preconfigured rules and privileges;
creating at least one pseudo account corresponding to each of the one or more roles; and
assigning at least one of the one or more roles to a plurality users for dynamically mapping the plurality of users to the at least one pseudo account for access to the at least one account based on the one or more roles, wherein each of the plurality of users has access to data associated with the at least one account, wherein each of the plurality of users is able to access data or perform one or more functions associated with the at least one account.

19. The method of claim 18, wherein the at least one account is at least one shared account and the service is a Software-as-a-Service.

20. A non-transitory computer-readable storage medium storing a computer program of instructions configured to be readable by at least one computer processor for instructing the at least one computer processor to execute a computer process for performing the method of claim 18.

* * * * *